United States Patent  [15] 3,684,047
Zeisloft et al.  [45] Aug. 15, 1972

[54] WHEEL SLIP LIMITING APPARATUS WITH MECHANICAL CONTROL

[72] Inventors: Harry C. Zeisloft; David L. Van Ostrom, both of Flint, Mich.

[73] Assignee: General Motors Corporation, Detroit, Mich.

[22] Filed: Dec. 23, 1970

[21] Appl. No.: 100,859

[52] U.S. Cl. .............. 180/77 R, 180/1 R, 180/8 Z, 188/181 C
[51] Int. Cl. ........................................... B60k 31/00
[58] Field of Search ....... 180/77 R, 98, 105 R, 105 E, 180/106, 1 R, 8 Z

[56] References Cited

UNITED STATES PATENTS 3,169,595  2/1965  Shepherd .................. 180/1 R
3,288,232  11/1966  Shepherd .................. 180/1 R Primary Examiner—Gerald M. Forlenza
Assistant Examiner—George F. Abraham
Attorney—Jean L. Carpenter, Paul Fitzpatrick and Warren D. Hill

[57] ABSTRACT

The maximum traction of a vehicle during acceleration is assured by a wheel slip sensitive variable duty cycle centrifugal switch for periodically interrupting engine ignition by an amount proportional to wheel speed difference so that if excessive slipping of the driven wheels occurs, the engine torque output is reduced to limit the wheel slip. A mechanical differential has inputs driven according to non-driven and driven wheel speeds and a carrier with a rotational speed proportional to the difference in wheel speeds. The centrifugal switch is operated in response to the carrier speed.

5 Claims, 3 Drawing Figures

PATENTED AUG 15 1972   3,684,047

INVENTORS
Harry C. Zeisloft &
BY David L. Van Ostrom

Warren D. Hill
ATTORNEY

WHEEL SLIP LIMITING APPARATUS WITH MECHANICAL CONTROL

This invention relates to a wheel slip limiting apparatus and more particularly to such an apparatus which includes a mechanical differential and an electrical switch for limiting wheel input torque. It is a common experience with automotive vehicles for excessive wheel slip or spinning to occur during vehicle acceleration. This happens when the operator causes an extremely high engine torque to be delivered to the driven wheels such that the frictional force between the tire and road are overcome. In the event that a road surface is slippery, a moderate engine torque can cause such slipping. While a small amount of slip between the tire and road surface is necessary to achieve a driving force, an excessive slip results in a reduction of effective driving force or traction.

It is therefore a general object of this invention to provide maximum traction during vehicle acceleration by a mechanically operated variable duty cycle switch arrangement for limiting the engine torque being produced when a driven wheel slips excessively.

It is a further object to reduce engine torque during wheel slipping by a mechanical differential operated according to driven and non-driven wheel speeds and an electrical switch responsive to the differential operation.

The invention is carried out by providing a mechanical differential having its inputs driven according to non-driven and driven wheel speeds including a carrier element having a speed proportional to wheel slip, and a variable duty cycle switch operated by the carrier speed and electrically connected for limiting output torque of the vehicle engine.

The above and other advantages will be made more apparent from the following specification taken in conjunction with the accompanying drawings wherein like reference numerals refer to like parts and wherein.

During vehicle acceleration slipping between the driven wheels and the road surface is always present; otherwise no tractive force would be developed. The amount of slip increases as driving torque applied to the wheels increases until the wheel traction reaches a maximum and thereafter traction decreases with further increase of wheel slip. The point of maximum traction varies according to road conditions. However, a representative value of 10 percent slip generally corresponds with maximum traction. The term "wheel slip" as used herein, is defined as wheel slip $= (W_d - W_n)W_n \times 100$ wherein $W_n$ is the speed of a non-driven wheel and $W_d$ is the speed of a driven wheel. The term "excessive wheel slip" as used herein means the amount of wheel slip in excess of that required for maximum traction.

The purpose of the apparatus of this invention is to limit the engine torque applied to the driven wheels when the wheel slip exceeds a predetermined value such as 10 percent, and to proportionately reduce the engine torque according to the amount by which the wheel slip exceeds the predetermined optimum value.

Figure 1:
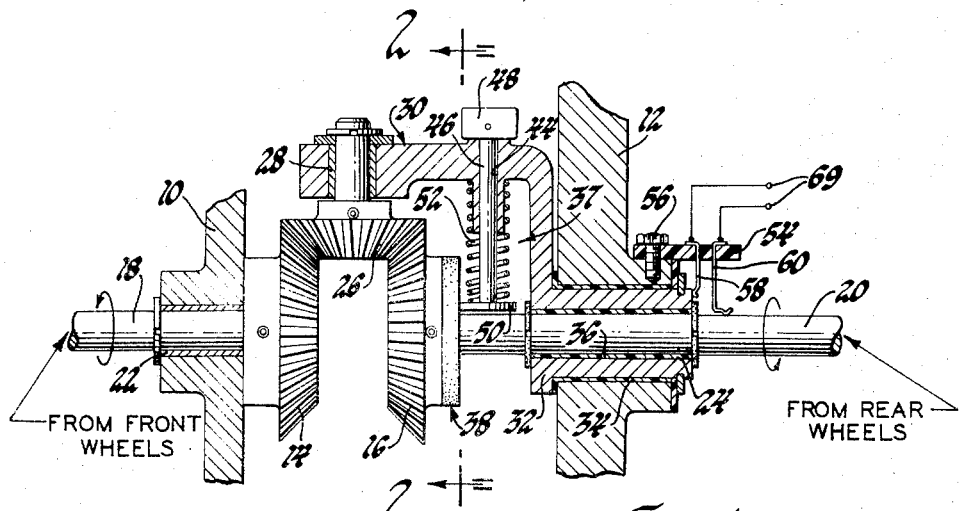
FIG. 1 is a cross-sectional elevational view of a mechanical differential incorporating a centrifugal switch for controlling engine torque according to the invention.

Referring to FIG. 1, the apparatus includes a mechanical differential comprising housing portions 10 and 12 and input gears 14 and 16 driven by shafts 18 and 20 respectively which are rotatably supported by sleeve bearings 22 and 24 in the housing portions 10 and 12. A planet gear 26 is engaged by both of the input gears and is rotatably supported through a journal bearing 28 by a carrier 30. The carrier includes a hub portion 32 rotatably mounted within a sleeve 34 carried by the housing portion 12. A bore 36 in the hub 32 carries the sleeve bearing 24 which supports the shaft 20. The sleeves 24 and 34 as well as the several gears are made of electrically insulating material such as nylon to provide electrical isolation of the carrier 30 from the shaft 20.

Figure 2:
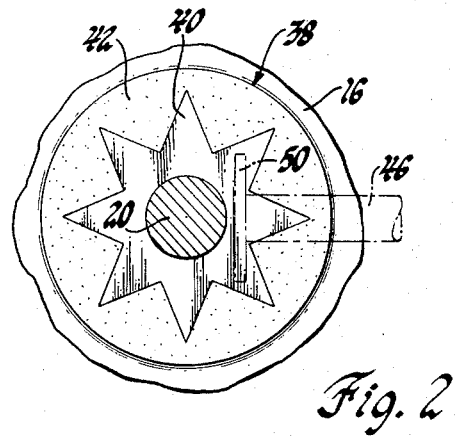
FIG. 2 is an elevational view of a switch contact detail taken through lines 2—2 of FIG. 1.

A variable duty cycle centrifugal switch 37 is included as an integral part of the mechanical differential. The outside face of the input gear 16 carries a switch contact 38 which is best shown in FIG. 2. The switch contact comprises a conductive star-shaped contact element 40 electrically connected to the shaft 20. The contact element comprises several radially extending finger portions integral with a circular portion concentric with the shaft 20. The contact element 40 is surrounded by a body of insulating material 42 flush with the surface contact element. The carrier 30 includes a radially disposed guide bore 44 which slidably and rotatably supports a rod 46. A mass 48 is secured to the outer end of the rod 46 and a contact wheel 50 is connected to the inner end of the rod 46 which is held thereby in electrical engagement with the switch contact 38. A coil spring 52 coaxial with the guide rod 46 extends between the carrier 30 and the contact wheel 50 to bias the contact wheel inwardly. A brush support 54 of insulating material is secured to the housing portion 12 as by a bolt 56 and carries a portion 58 in wiping engagement with the carrier hub 32 and a brush 60 in wiping engagement with the shaft 20. Leads 69 extend from the brushes.

Figure 3:
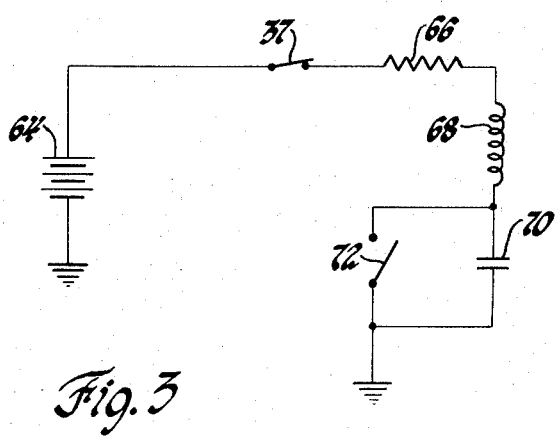
FIG. 3 is a schematic diagram of a portion of an engine ignition circuit incorporating the switch of FIG. 1.

When installed in a vehicle, the shafts 18 and 20 are connected with the front and rear wheels respectively as by flexible cables similar to speedometer cables so that the shaft rotation speeds are proportional to the driven and non-driven wheel speed. Of course, the shaft 20 may optionally be driven by the vehicle propeller shaft for a rear-drive vehicle provided suitable gearing is included to compensate for the speed reduction in the vehicle differential. Further, as shown in FIG. 3, the variable duty cycle centrifugal switch 37 is electrically connected in series between a vehicle battery 64 and the primary side of the vehicle ignition circuit which includes a resistor 66, a primary coil 68 and a condenser 70 in series and breaker points 72 connected across the condenser.

In operation, assuming a rear-drive vehicle, when the front and rear wheels have equal speeds, the input gears 14 and 16 will be driven at equal speeds in opposite directions so that the carrier 30 will be stationary and the contact wheel 50 will be spring-biased to its innermost position as shown in broken lines in FIG. 2. As the switch contact 38 rotates with the input gear 16, the contact wheel 50 will be in constant engagement with the circular portion of the contact element 40 and the switch will remain closed so that the ignition circuit operates normally. During normal vehicle acceleration, the rear wheels will slip slightly so that the input gear 16 is driven faster than the input gear 14 causing the carrier 30 to rotate at a rate proportional to the wheel speed difference. The carrier rotation produces a centrifugal force on the combination of the contact wheel 50, the rod 46 and the mass 48 so that the contact wheel will be moved radially outwardly against the bias of the spring 52. The spring constant and the mass 48 are selected so that the contact 50 moves radially outwardly only slightly and still maintains constant engagement with the circular portion of the contact element 40. However, in the event excessive wheel slip occurs, the wheel speed differential becomes larger and the carrier speed increases correspondingly so that the contact wheel is moved further outward to contact only the finger portions of the contact element 40 and the engagement of the switch elements is periodically interrupted as the contact wheel 50 passes over portions of insulating material 42 between the fingers of the contact element 40 to effect a periodic interruption of the ignition circuit to reduce engine output torque. The change in torque will tend to decrease the amount of wheel slip to its normal range where maximum traction is provided. Of course, the amount of outward movement of the contact wheel 50 depends upon the degree of excessive wheel slip such that as wheel slip increases, the ratio of switch open time to switch closed time will proportionately increase so that the amount of ignition circuit interruption and torque reduction will occur correspondingly.

It is expected that the principles of the invention may be carried out by apparatus which differs from the embodiment described herein. It is feasible, for example, for the switch contact 38 to be mounted in a stationary manner as on the wall of the housing. The centrifugal force producing apparatus for controlling the element 50 may take many forms. Further, the reduction of engine torque in response to the action of the switch 37 may be carried out by alternate means, for example, by controlling engine throttle position as a function of the switch output.

The embodiment of the invention described herein is for purposes of illustration and the scope of the invention is intended to be limited only by the following claims:

It is claimed:

1. In a vehicle having an engine, a wheel driven by the engine and a non-driven wheel, the driven wheel being liable to slipping in excess of that required for maximum traction in the event excessive torque is applied thereto by the engine, apparatus for limiting excessive wheel slip of the driven wheel comprising a mechanical differential having a pair of input gears, a carrier, and a carrier mounted planet gear driven by the input gears, means for driving the input gears at speeds proportional to the speeds of the driven and non-driven wheels such that the carrier rotates at a speed proportional to the excess of driven wheel speed over the non-driven wheel speed, switch means responsive to carrier speed for periodically opening and closing when the carrier speed exceeds a minimum value corresponding to incipient excess wheel slip, and means associated with the engine and responsive to the switch means for reducing engine torque upon the occurrence of excess wheel slip.

2. In a vehicle having an engine, a wheel driven by the engine and a non-driven wheel, the driven wheel being liable to slipping in excess of that required for maximum traction in the event excessive torque is applied thereto by the engine, apparatus for limiting excess wheel slip of the driven wheel comprising a mechanical differential having a pair of input gears, a carrier, and a carrier mounted planet gear driven by the input gears, means for driving the input gears at speeds proportional to the speeds of the driven and non-driven wheels such that the carrier rotates at a speed proportional to the excess of driven wheel speed over the non-driven wheel speed, switch means responsive to carrier speed, the switch means being normally closed at carrier speeds below a minimum value corresponding to the onset of excess wheel slip and including means for periodically opening and closing the switch means at carrier speeds above the minimum value and for increasing the ratio of open switch time to closed switch time according to carrier speed, and means associated with the engine and responsive to the switch means for reducing the engine torque by an amount dependent upon the carrier speed.

3. In a vehicle having an engine, a wheel driven by the engine and an non-driven wheel, the driven wheel being liable to slipping in excess of that required for maximum traction in the event excessive torque is applied thereto by the engine, apparatus for limiting excess wheel slip of the driven wheel comprising a mechanical differential having a pair of input gears, a carrier, and a carrier mounted planet gear driven by the input gears, means for driving the input gears at speeds proportional to the speeds of the driven and non-driven wheels such that the carrier rotates at a speed proportional to the excess of driven wheel speed over the non-driven wheel speed, a variable duty cycle switch responsive to carrier speed and activated at a minimum carrier speed corresponding to the onset of excess wheel slip, including means for varying the duty cycle of the switch with changes of carrier speed above the minimum speed, and means associated with the engine and responsive to the variable duty cycle switch for reducing the engine torque according to the amount of excess wheel slip.

4. In a vehicle having an engine, a wheel driven by the engine and a non-driven wheel, the driven wheel being liable to slipping in excess of that required for maximum traction in the event excessive torque is applied thereto by the engine, apparatus for limiting excess wheel slip of the driven wheel comprising a mechanical differential having a pair of input gears, a carrier, and a carrier mounted planet gear driven by the input gears, means for driving the input gears at speeds proportional to the speeds of the driven and non-driven wheels such that the carrier rotates at a speed proportional to the excess of driven wheel speed over the non-driven wheel speed, a centrifugal switch including a first contact element mounted on the carrier for rotation therewith and for radial movement of the first contact element, centrifugally operated means for controlling radial movement of the first contact element according to carrier speed, and a second contact element mounted in the plane of movement of the first contact element for contact thereby during carrier rotation, the second contact element having one portion in constant contact with the first contact element when the first contact element is in a radial position corresponding to low carrier speeds and another finger-like portion integral with the one portion for intermittent contact with the first contact element when the first contact element is in a radial position corresponding to a carrier speed exceeding a minimum value corresponding to the onset of excess wheel slip, and means associated with the engine and responsive to the centrifugal switch for reducing the engine torque during periods of excess wheel slip.

5. In a vehicle having an engine, a wheel driven by the engine and a non-driven wheel, the driven wheel being liable to slipping in excess of that required for maximum traction in the event excessive torque is applied thereto by the engine, apparatus for limiting excess wheel slip of the driven wheel comprising a mechanical differential having a pair of input gears, a carrier, and a carrier mounted planet gear driven by the input gears, means for driving the input gears at speeds proportional to the speeds of the driven and non-driven wheels such that the carrier rotates at a speed proportional to the excess of driven wheel speed over the non-driven wheel speed, a variable duty cycle switch comprising a pair of contact elements, one contact element being mounted on one of the input gears for rotation therewith and including a circular portion concentric with the axis of rotation of the one input gear and at least one finger portion extending outwardly from the circular portion, the other contact element being mounted on the carrier for movement therewith and spring-biased toward the axis of rotation for contact with the circular portion to provide an uninterrupted contact between the contact elements, centrifugal force producing means subject to carrier rotation for moving the other contact element radially outwardly against the spring bias into contact with the finger portion to provide interrupted contact between the contact elements when the carrier speed exceeds a minimum value corresponding to the onset of excess wheel slip, wherein the finger portion is shaped to diminish the period of contact between the contact elements as the carrier speed increases, and means associated with the engine and responsive to the variable duty cycle switch for reducing the engine torque according to the amount of excess wheel slip.

* * * * *